United States Patent [19]

Nguyen et al.

[11] Patent Number: 5,016,167
[45] Date of Patent: May 14, 1991

[54] RESOURCE CONTENTION DEADLOCK DETECTION AND PREVENTION

[75] Inventors: Kham X. Nguyen, Milpitas; Theodore S. Robinson, Cupertino; Michael D. Taylor; Kevin L. Daberkow, both of San Jose, all of Calif.

[73] Assignee: Amdahl Corporation, Sunnyvale, Calif.

[21] Appl. No.: 135,845

[22] Filed: Dec. 21, 1987

[51] Int. Cl.⁵ ..................... G06F 13/14; G06F 15/16
[52] U.S. Cl. ................. 364/200; 364/241.8; 364/242.5; 364/228.7; 364/242.6
[58] Field of Search ... 364/200 MS File, 900 MS File

[56] References Cited

U.S. PATENT DOCUMENTS

| | | | |
|---|---|---|---|
| 4,028,663 | 6/1977 | Royer et al. | 364/900 |
| 4,231,086 | 10/1980 | Tarbox et al. | 364/200 |
| 4,393,459 | 7/1983 | Huntley et al. | 364/900 |
| 4,494,193 | 1/1985 | Brahm et al. | 364/200 |
| 4,574,350 | 3/1986 | Starr | 364/200 |
| 4,663,709 | 5/1987 | Fujiwara et al. | 364/200 |

*Primary Examiner*—Gareth D. Shaw
*Assistant Examiner*—John Loomis
*Attorney, Agent, or Firm*—Fliesler, Dubb, Meyer & Lovejoy

[57] ABSTRACT

In a multiprocessor system with an interleaved memory, predicted busy terms for interleaves of the main store being accessed are sent to each processor in the system, so that they will not waste pipe flows making requests to the busy interleaves. The predicted busy term is lowered before access to the interleaves is complete, to allow for the latency between the time the processor sets up the request and the time the main store system receives it. Contention occurs when several processors request access to the same interleave of main store. To detect deadlocks, a counter for each processor keeps track of the number of consecutive requests from that processor which have been rejected. Once the number reaches a threshold for a first processor, its counter initiates a state machine which inhibits other processors from making requests to the main store until the first processor is successful in gaining access.

4 Claims, 7 Drawing Sheets

RESOURCE CONTENTION DEADLOCK DETECTION AND PREVENTION

CROSS-REFERENCES TO RELATED APPLICATIONS (1) MOVE-OUT QUEUE BUFFER; Ser. No. 06/909,500; filed Sept. 19, 1986; inventors, Jeffrey A. Thomas, Theodore J. Robinson, Robert A. Ertl, Harold F. Christensen Jr.

(2) CACHE MOVE-IN BYPASS; Ser. No. 07/041,046; filed Apr. 20, 1987; inventors, Jack Chen, Jeffrey A. Thomas, Joseph A. Petolino Jr, Michael J. Begley, Ajay Shah, Michael D. Taylor, Richard J. Tobias.

The related applications referred to are incorporated by reference as is fully set forth herein. Such applications were owned at the time of invention by the same assignee as the present invention and are currently so owned.

BACKGROUND OF THE INVENTION

1. Field of the Invention

The present invention relates to apparatus for detecting and preventing deadlock among multiple processors contending for access to a single resource, such as main memory.

2. Description of Related Art

In multiprocessor computer systems which share a single main storage system, each of the processors in the system may at the same time attempt to access the main storage system. Accordingly, a variety of priority-based algorithms has been developed to assure that at least one of the processors in the system is successful at a given time, while all the processors have access to the main storage system over a period of time.

In mainframe computer systems, such as the Amdahl system 5890, the main storage system is partitioned into a plurality of modules, or interleaves. The data is stored in the modules in an interleaved fashion such that a string of eight lines of data having consecutive addresses will be located in eight different modules of the main store. Further, each of the modules is adapted so that it can be accessed independently of the other modules. In this manner, a main storage system can accept requests for access to more than one module at a time, improving system performance.

In the Amdahl machine, in order to access data in one memory module, a CPU sends a request to a system control unit. Upon accepting a request for a given memory module, the system control unit will raise a busy term for the module to be accessed, so no more requests to that module are accepted by the system control unit until the first access is completed. Further, a predicted busy term for the accessed module is sent to each CPU in the system to minimize pipeline flows making requests to the system control unit for the busy module. The predicted busy term is lowered sooner than the actual busy term in the system control unit, in order to allow for the predicted latency between the time the CPU sets up a request in its pipeline and the time the system control unit receives it.

A contention occurs when several CPUs request the same memory module at a time. If a high priority CPU is in the loop making requests to the system control unit, it can prevent other CPUs from accessing that module. This becomes a deadlock, for example, if the information subject of the high priority CPU request is held by another CPU, and the CPU holding the information cannot access a memory module to release the information.

A prior art approach preventing deadlock involves assigning random priority to the different CPUs in the system. In this manner, a given CPU will not retain its high priority status for a period of time long enough to cause a serious degradation in performance due to deadlocks. This random priority alternative has a number of disadvantages. For instance, all of the CPUs in the system which failed to access the memory module at their last attempt, must make requests to the system control unit in the same cycle as the module is released by the actual busy term. Otherwise, a race condition will be set up that causes a de facto priority for CPUs able to make requests more quickly than others. In order to assure that all requests arrive at the system control unit at the same cycle, a number of constraints are placed on the CPU main store access request logic. Further, the predicted busy term must be eliminated and replaced by an accurate busy term. Because the latency between the CPU request and the completion of a previous access to a memory module varies from process to process, an accurate busy term for supply to each of the CPUs in the system would require very complicated logic or cause the system to suffer performance loss. In addition, the randomization circuit is in itself quite complicated.

Deadlock detection and resolution schemes of the prior art in systems without the predicted busy term are typified by U.S. Pat. No. 4,494,193 invented by Brahm et al., entitled DEADLOCK DETECTION AND RESOLUTION SCHEME. The Brahm et al. patent provides a general background discussion of deadlock schemes in communication systems.

It is found that the predicted busy term provides a substantial performance gain in the Amdahl 5890 systems having two CPUs, which are incapable of entering into a deadlock for the memory modules due to pipeline configuration. Accordingly, it is desirable to maintain the predicted busy logic in the mainframe computer systems while preventing deadlocks for access to the system resources that may occur in systems with more than two CPUs.

SUMMARY OF THE INVENTION

The present invention provides a data processing system that retains the performance advantages of the predicted busy term while detecting and preventing a contention deadlock for access to main storage among competing processing units.

In a data processing system including more than two processing units that generate requests for system data and a main storage unit storing the system data at data locations addressed by system addresses, that is partitioned into a plurality of modules, a control means is provided for supplying requests for system data to the plurality of modules in the main storage unit.

The control means includes a request selector coupled to the processing units and responsive to an inhibit signal and a processing unit priority, for selecting a request from a processing unit having priority that is not inhibited by the inhibit signal. In addition, means, coupled to the selector and responsive to a selected request, is provided for accepting the selected request when the module identified in the system address of the request is not busy or else rejecting the request if the module is busy. Further, the control means includes means, coupled to each of the processing units and the means for accepting requests, and responsive to a threshold number of consecutive rejections of requests from one of the processing units, for generating the inhibit signal. The inhibit signal indicates the processing units to be inhibited from selection by the selector until the one processing unit that had suffered the threshold number of consecutive rejections, generates a request that is accepted. The control means also includes means coupled to each of the processing units and the means for accepting requests, for generating in response to accepted requests a predicted busy signal indicating when accesses to modules identified in the accepted requests may be complete.

Each of the processing units in the data processing system is connected to receive the predicted busy signal from the control means and includes means for enabling the generation of a request for system data in response to the predicted busy signal.

DESCRIPTION OF THE PREFERRED EMBODIMENT

I. System Overview

Figure 1:
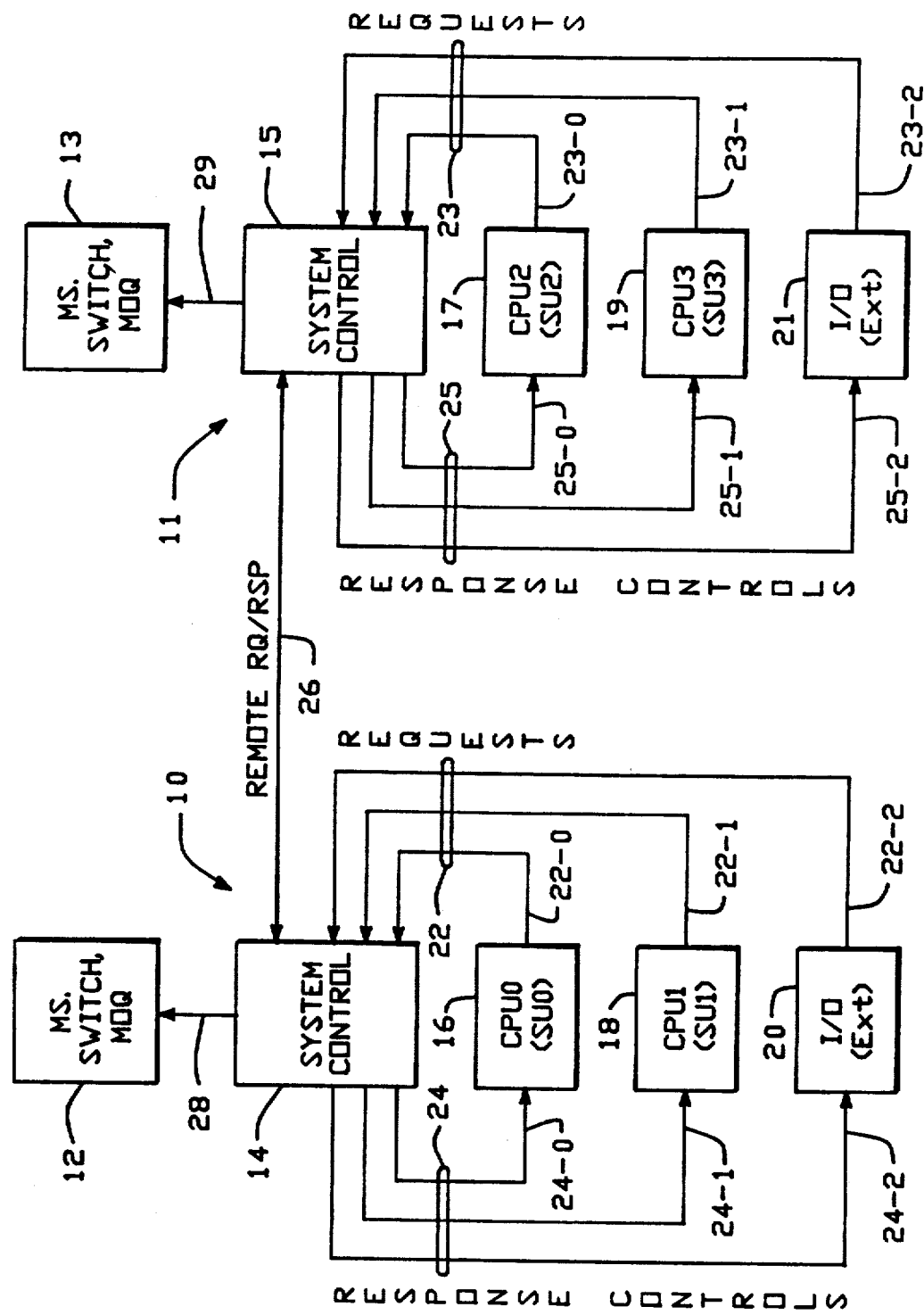
FIG. 1 is a block diagram of the control paths for a multiprocessor data processing system according to the present invention.
Figure 2:
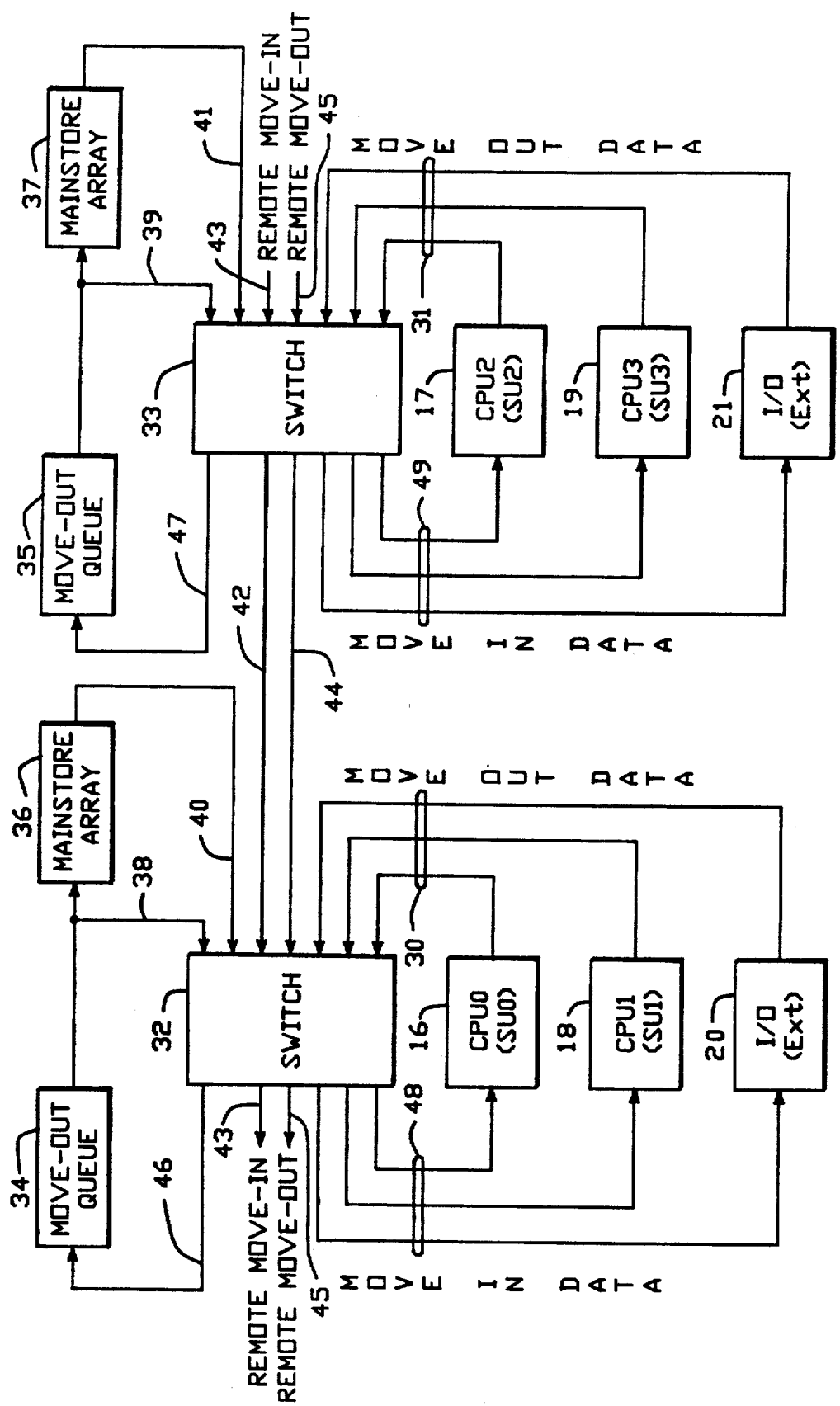
FIG. 2 is a block diagram of the data paths in the data processing system shown in FIG. 1.
Figure 3:
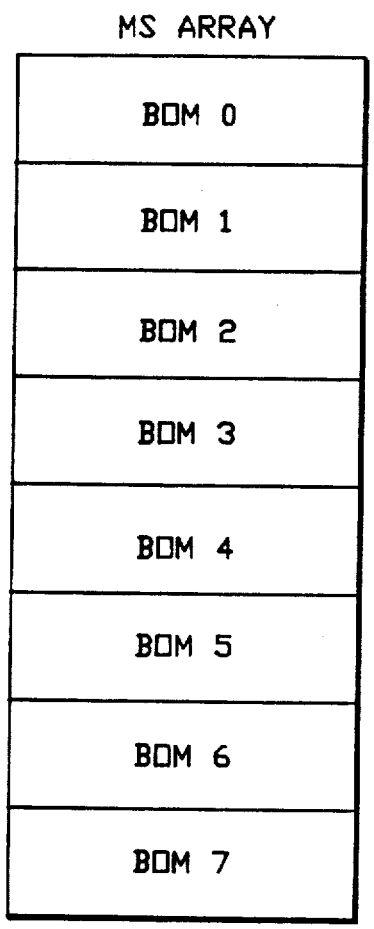
FIG. 3 is a heuristic diagram of a main store array in the data processing system according to the present invention.

FIGS. 1-3 set out the system overview for the data processing system according to the preferred embodiment of the present invention. In FIG. 1, the control and address paths are illustrated. FIG. 2 illustrates the data paths. FIG. 3 illustrates the interleaved main store array used according to the preferred embodiment.

FIG. 1 shows the control and address paths in the multiprocessor system through which requests for access to the main storage system (main store) are made. In the preferred embodiment, there are two halves 10, 11, of the multiprocessor system. Each half includes a main storage system 12, 13, a system controller 14, 15, a first central processing unit 16, 17, and a second central processing unit 18, 19. In addition, each half includes an input/output (I/O) server 20, 21. The central processing units 16, 18, in the first half 10 are identified as CPU0 and CPU1, respectively. The central processing units 17, 19, in the second half 11 of the system are identified as CPU2 and CPU3 for the purposes of this disclosure.

Each CPU generates requests across lines 22, 23 and receives responses and control signals across lines 24, 25. Thus, CPU0 generates requests on line 22-0 which is connected to system controller 14. The system controller 14 generates response and control signals across lines 24-0 which are connected to CPU0 16. Likewise, CPU1 18 generates requests on line 22-1 which are supplied to the system controller 14. The system controller 14 responds across line 24-1 to CPU1 18. In addition, the I/O server 20 generates requests for access to the main storage system on line 22-2 and the system controller 14 responds across line 24-2 to the I/O server 20.

In a similar manner, the system controller 15 in the second half 11 of the data processing system, receives requests on lines 23 and generates responses and control signals across lines 25 for supply to the respective CPUs. CPU2 17 generates requests on line 23-0 for supply to the system controller 15. The system controller 15 responds across lines 25-0. The CPU3 generates requests across line 23-1 to the system controller 15 and receives responses across lines 25-1. The I/O server 21 generates requests on line 23-2 and receives responses from the system controller 15 across lines 25-2.

The system controllers 14, 15, communicate requests and responses between each other across lines 26. The system controllers 14, 15, coordinate the supply of requests to the main storage systems 12 and 13 from the plurality of central processing units across lines 28, 29. The control signals on lines 28 and 29 are timing and control signals which coordinate the flow data among the various elements of the system.

FIG. 2 illustrates the data paths among the various elements in the system that are controlled by the timing and control signals generated in the system controllers 14 and 15 of FIG. 1. Each of the central processing units includes a storage unit having a high speed cache for use by the execution and instruction units of their respective CPUs. Thus, as illustrated in FIG. 2, CPU0 includes storage unit 0 (SU0), CPU1 includes storage unit 1 (SU1), CPU2 includes storage unit 2 (SU2), and CPU3 includes storage unit 3 (SU3). The data processing system may also have data from input/output devices external to the system supplied through the I/O servers 20, 21.

The main storage system on each half includes a crossbar switch 32, 33, a move-out queue 34, 35, and a main store array 36, 37. The move-out queue is described in detail in the above-referenced, related U.S. patent application entitled MOVE-OUT QUEUE BUFFER. The move-out queue is basically an apparatus for buffering data in a move-out flow from the main storage unit to the main store array in order to increase the performance of data in move-in flows from the main store array to a central processing unit high speed cache.

Each crossbar switch 32, 33 receives as input data from the move-out queue on lines 38, 39, data from the main store array on lines 40, 41, move-in data from the remote switch on lines 42, 43, and move-out data from the remote switch on lines 44, 45. In addition, each switch 32, 33 receives move-out data from its local CPUs (CPU0, CPU1 or CPU2, CPU3) on lines 30, 31 and from its local I/O server 20, 21 on lines 30, 31.

Each switch 32, 33, supplies move-out data on lines 46, 47 to the respective move-out queues 34, 35. Remote move-in data and remote move-out data are supplied by switch 32 on lines 43 and 45 for supply to the switch 33 and by switch 33 on lines 42 and 44, for supply to switch 32. Finally, move-in data is supplied to the respective CPUs on lines 48 and 49 from the switch to the local CPUs or the I/O servers 20 and 21.

The main store array is illustrated in FIG. 3. It includes eight basic operating modules BOM0-BOM7. The data locations within the main store array are addressed in the preferred embodiment by a 32-bit address, bits 0-31, with bit 0 being the most significant bit. The byte address for a given data location is provided by bits 26-31. The basic operating module identifier is system address bits 23-25. Thus, the sequence of consecutive lines of main store addresses will be located in different basic operating modules. This feature provides interleaving of the main store array.

In summary, the multiprocessor data processing system, according to the present invention, includes a system controller receiving requests from storage units in the respective CPUs and coordinating access to a plurality of basic operating modules in the main storage system. When more than one CPU attempts to access the same basic operating module at the same time, the system controller selects one CPU according to priority logic. Because there is a plurality of CPUs in a given system, the potential for deadlock arises. What follows is a description of the operation of the storage unit within a given CPU, generating requests for access to the main storage system and the implementation of the system controller as it relates to the present invention.

II. The Storage Unit Pipeline and Predicted Busy

Figure 4:
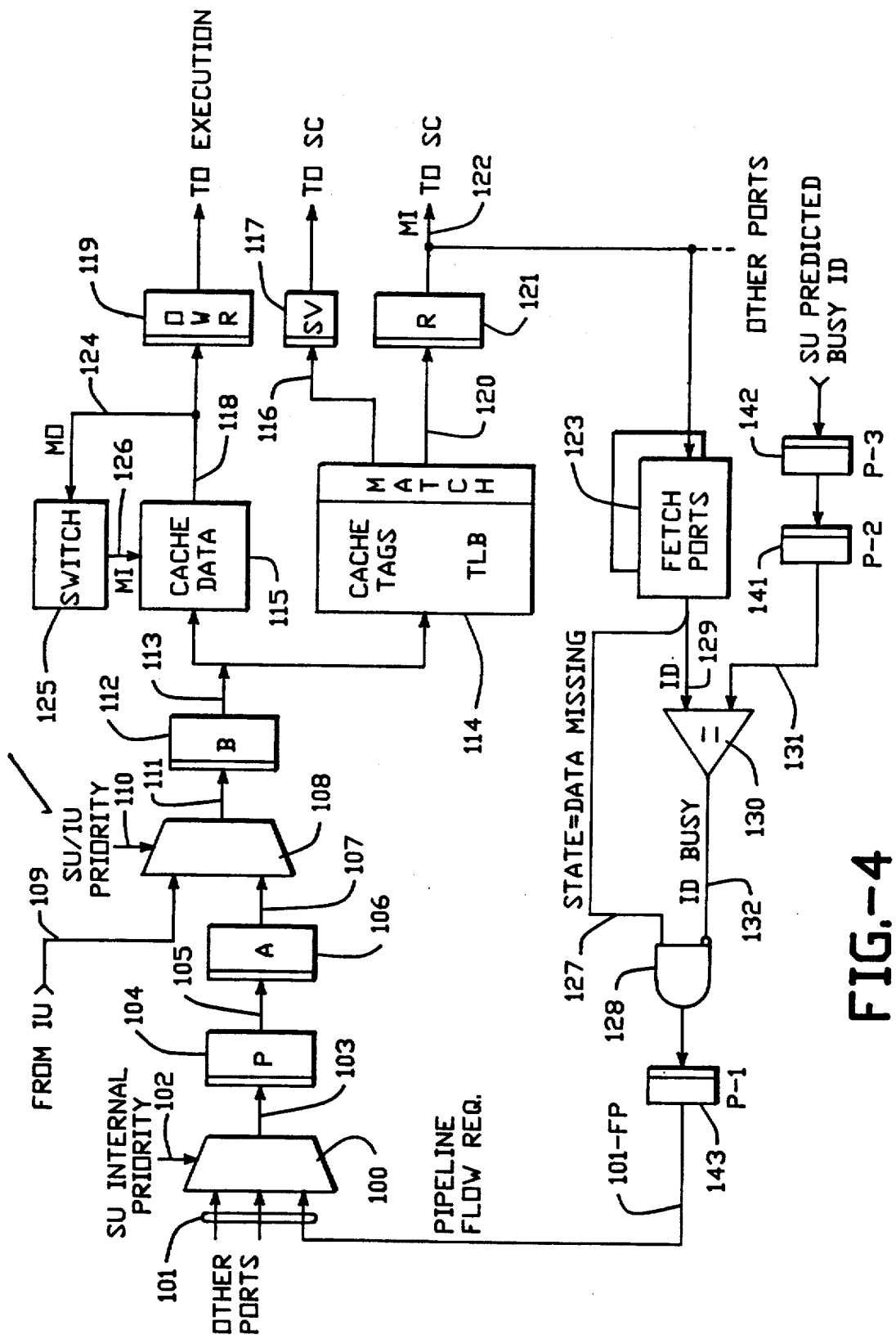
FIG. 4 is a pipeline flow diagram for the storage unit of a CPU according to the present invention in which requests for access to the main store are generated.

FIG. 4 is a heuristic diagram of the storage unit pipeline for each of the CPUs in the data processing system of the present invention. It is a four-stage pipeline with the stages labeled P, A, B and R.

The pipeline includes an internal port selector 100 which receives as inputs requests for access to the high speed cache in the storage unit from a plurality of ports across lines 101. It selects according to the internal priority of the storage unit as indicated on line 102, a single request across line 103 for supply to the P register 104. The output of the P register is staged across line 105 to the A register 106. The request in the A register 106 is supplied across line 107 as input to a selector 108. The other input to the selector 108 is a request from an instruction unit in the CPU on line 109. The priority between the storage unit and the instruction unit is indicated on line 110. The request selected by selector 108 is supplied on line 111 to the B register 112. Access to the cache is staged from the B register 112 across lines 113. The request is supplied to the cache tag and translation lookaside buffer arrays 114 and to the cache data arrays 115. If the system address of data in the cache data array as indicated by the cache tags, matches the system address of the request identified in the translation lookaside buffer, a status valid signal is supplied on line 116 to a status valid register 117. In parallel with the supply of the status valid signal, cache data is supplied on line 118 to the operand word register 119. In the event that there is no match detected in the cache tags and translation lookaside buffer 114, the request is supplied on line 120 to the R register 121. From the R register, the request is staged to the system controller on line 122 and to fetch ports 123. In addition, the request may be supplied to other ports within the storage unit, depending on the type of request.

Data from the cache data array is moved out across line 124 to the switch 125 and moved in to the cache data array from the switch 125 across lines 126. The switch 125 corresponds to the switches illustrated in FIG. 2 above, providing a path to the main storage system. The fetch ports 123 hold a request for cache data when the first access to the cache has been unsuccessful while the data is moved in from the main storage array across line 126. From the fetch ports, a request is staged through the storage unit internal selector 100 into the storage unit pipeline in order to retry an access to the cache.

Each time a request attempts to access data in the cache and it is determined that the line of data is missing, a move-in request is staged from the R register 121 to the system controller. If the move-in request is accepted, the data will be moved into the cache in a subsequent move-in flow from the main storage system. Whenever a move-in request is rejected, the request will be restaged from fetch ports 123 until a request is successful.

The requests from fetch ports 123 are supplied on line 127 to a controlling gate 128. In addition, the ID of the basic operating module of the main store to which the fetch refers, is supplied on line 129 to comparator 130. The storage unit predicted busy signal which identifies the basic operating modules of the main store that are predicted to be busy, is supplied on line 131. Registers 141 and 142 are shown in the path of the storage unit predicted busy to indicate two cycles required for staging the signal from the system controller. If the ID on line 129 matches the predicted busy IDs from line 131, the ID busy signal is asserted on line 132. The control gate 128 will supply the request from line 127 through register 143 as an input to the S-Unit selector 100 across line 101-FP when the ID busy signal on line 132 is not asserted.

In this manner, the predicted busy signal is used to prevent the storage unit selector 100 from receiving requests from fetch ports that may result in an attempt to move in data from a basic operating module of the main store that is predicted busy by the predicted busy signal on line 131. Wasted pipeline flows are thereby avoided.

Figure 8:
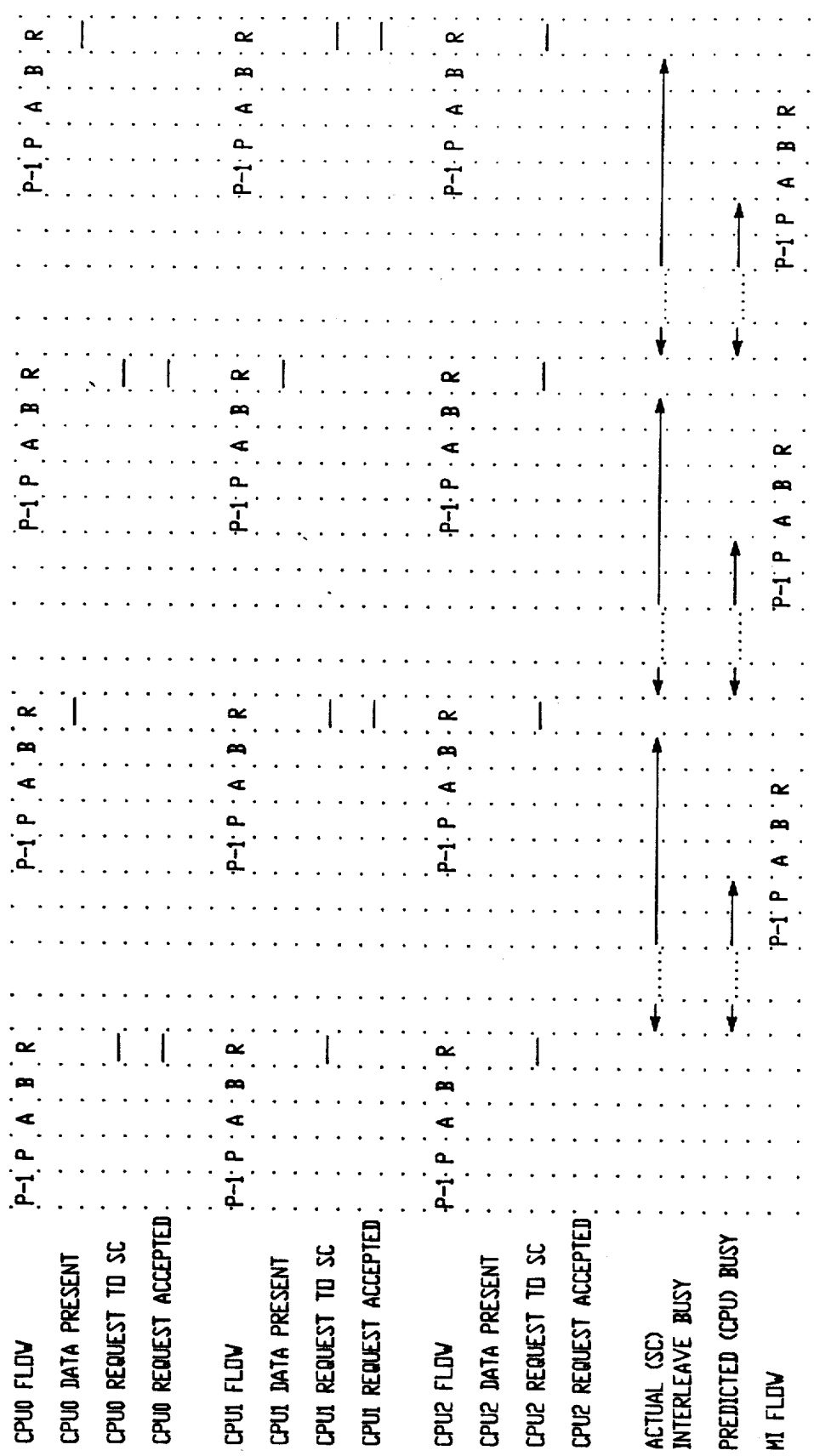
FIG. 8 is a pipeline flow diagram illustrating the resource contention deadlock in the data processing system of the present invention.
Figure 9:
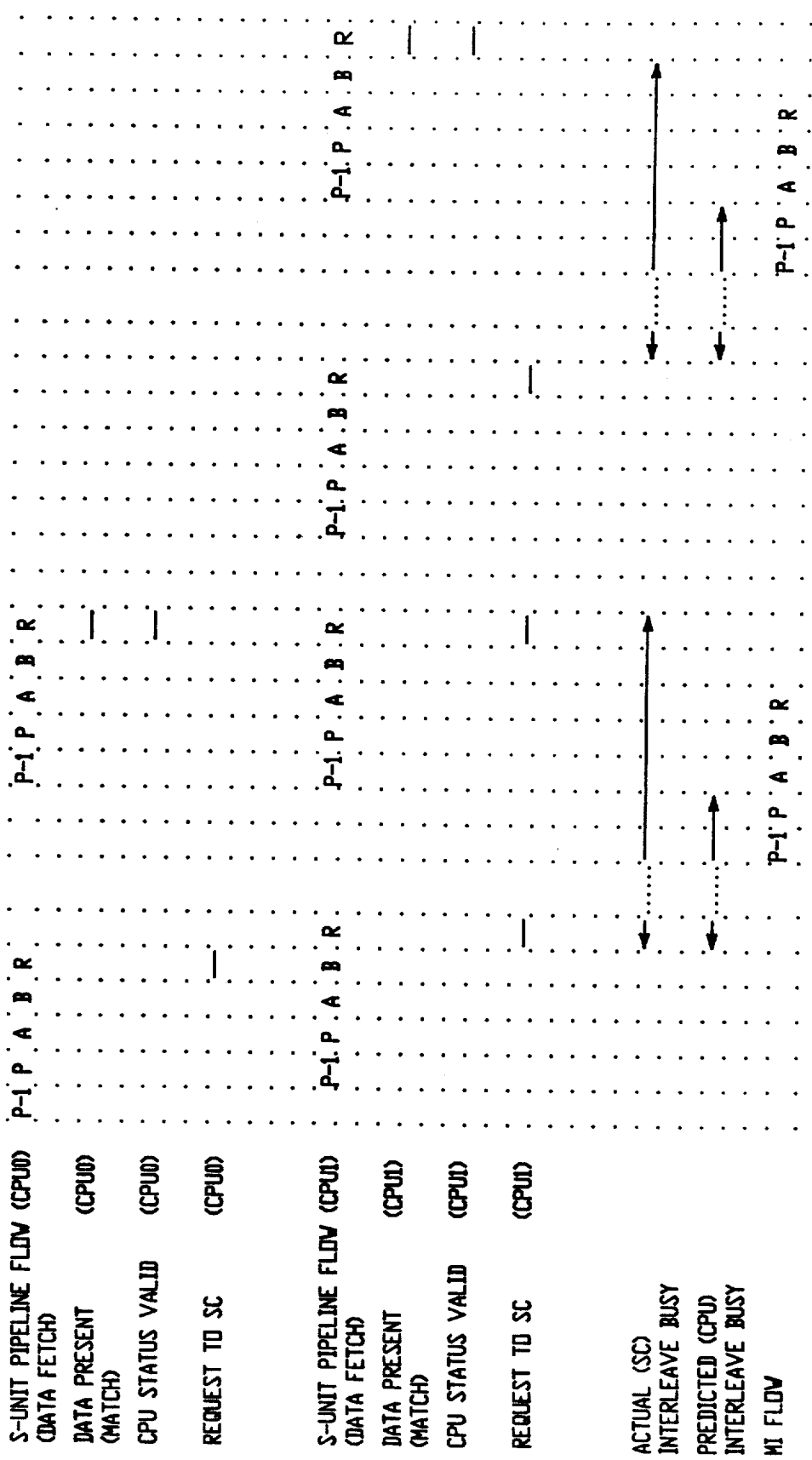
FIG. 9 is a pipeline flow diagram illustrating the operation of the predicted busy term generated according to the present invention.

FIGS. 8 and 9 illustrate the pipeline flows of the storage units for multiple CPUs according to the present invention. FIG. 8 illustrates contention for access to a basic operating module of the main store among three CPUs. The flow from CPU0, CPU1 and CPU2 is indicated by the stage letters PABR. As can be seen in FIG. 8, each CPU initiates a flow in the same cycle. CPU0, having the highest priority, will issue a request to the storage controller in the R stage of its pipeline and have the request accepted. CPU1 and CPU2 will likewise generate requests for access to the main store in their R stages. However, the requests will not be accepted.

When the request is accepted from CPU0, the system controller will issue a busy signal for the accessed interleave for an indeterminate number of cycles (ACTUAL(SC) INTERLEAVE BUSY). Further, it will generate a predicted busy signal for supply to all the CPUs (PREDICTED (CPU) BUSY). When the move-in of data in response to a request from CPU0 is begun (MI FLOW, shown heuristically), the predicted busy signal will be lowered and each of the CPUs will initiate a new request for access to data. CPU0 will find the data subject of the request present in its cache in the R stage. CPU1 and CPU2 will again generate requests for access to the storage controller. CPU1 will have its request accepted because of its higher priority, while CPU2 will have its request rejected. The system controller becomes busy until the request from CPU1 is successful. Likewise, the predicted busy signal will be asserted for each of the CPUs until the move-in flow begins. When the predicted busy signal is lowered, each of the CPUs will make another request for access to data. CPU1 will find the data present in its cache while CPUs 0 and 2 will make a request for access to the system controller. CPU0 because of its higher priority will have its requested accepted and cause the system controller to assert its actual and predicted busy signals. When the move-in flow begins in response to the request of CPU0, the predicted busy signal will be lowered and the CPUs will make an additional request. CPU0 will find its data present in the cache. CPU 1 will have its request to the system controller accepted and CPU2 will have its request rejected.

In this manner, it can be seen that CPU2 will never have its request in the system controller accepted as long as higher priority CPUs continue to make consecutive requests to the same basic operating module in the main store. Thus, the process in CPU2 attempting to obtain access to a particular element of data will be deadlocked. The present invention addresses this problem.

FIG. 9 illustrates the pipeline flows that occur because the predicted busy signal is an estimate of the cycle in which the system controller will be available for accepting requests to identified modules, rather than an accurate indicator of that cycle.

The pipeline flows in FIG. 9 illustrate a first flow in CPU0 which results in a request to the system controller in its R stage. A second flow by CPU1 begins one cycle after the flow in CPU0. It likewise generates a request to the system controller in its R cycle. Because the system controller is busy at the time it makes the request, its request is rejected. When the move-in flow in response to the request for CPU0 is initiated, the predicted busy signal is lowered. In response to this, each CPU initiates its request again. CPU0 will find its data present and assert a status valid signal. CPUI will generate a request to the system controller in its R cycle. However, because the predicted busy signal is inaccurate, the CPU1 finds that the system controller actual busy term is still asserted at that time. Therefore, its request is rejected once again. Some number of cycles later it will again generate its flow, resulting in a request to the system controller in its R cycle. Its request will be accepted and the system controller actual busy and predicted busy terms are asserted once again. When the predicted busy terms are lowered during the move-in of the data in response to the request from CPU1, it will re-initiate its request for the data and find its data present and assert a status valid signal in the R cycles.

The generation of the predicted busy signal is described in more detail below with reference to the system controller.

III. Implementation of the System Controller for Deadlock Prevention

Figure 7:
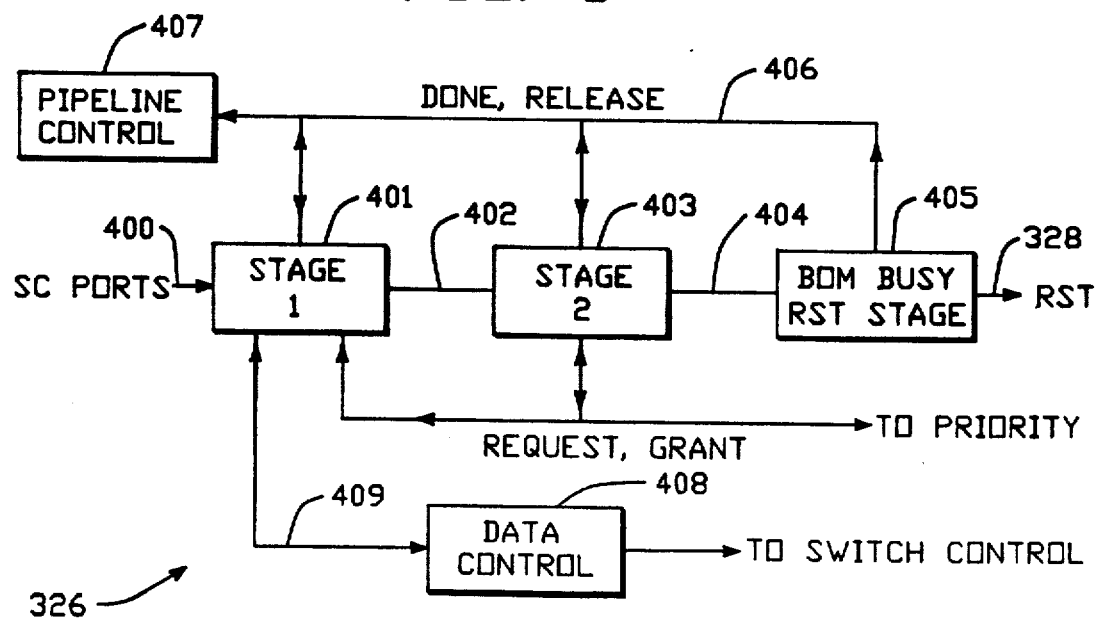
FIG. 7 is a state diagram for the move-in server in the system controller according to the present invention.
Figures 5, 6:
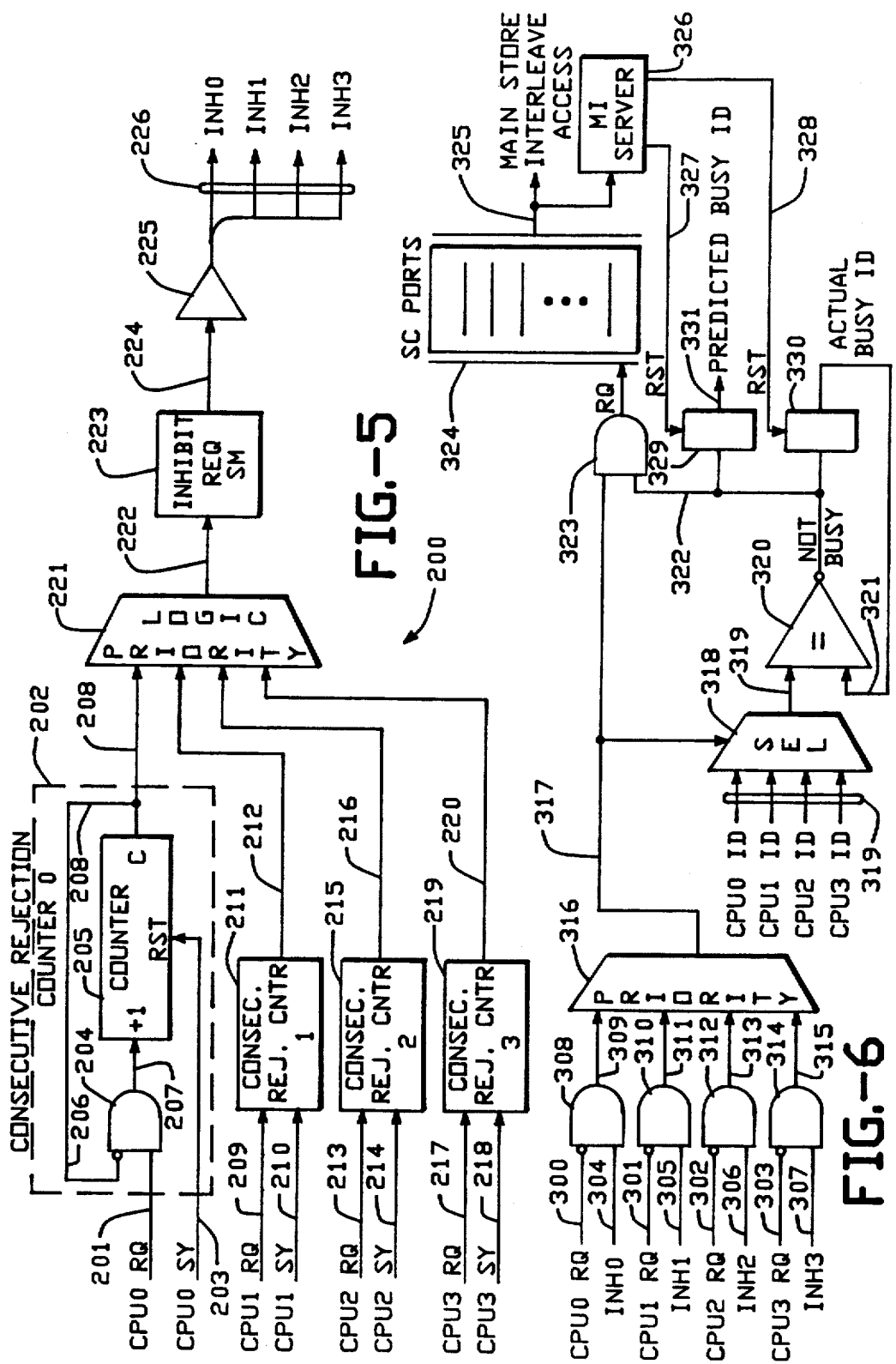
FIG. 5 is a block diagram of the deadlock detection and prevention circuit in the system controller for the data processing system of the present invention.
FIG. 6 is a logic diagram of the request acceptance and selection logic in the system controller in the data processing system of the present invention.

FIGS. 5, 6 and 7 are block diagrams illustrating the implementation of the system controller according to the preferred embodiment of the present invention as it relates to a deadlock prevention and detection. FIG. 5 shows a means 200 coupled to each of the processing units in the system for detecting a number of consecutive rejections of requests from each of the CPUs and generating inhibit signals that indicate which processing units must be inhibited from selection by the system controller in order to break potential deadlocks.

CPU0 requests are supplied on line 201 to a consecutive rejection counter 202. Likewise, the status valid signal from CPU0 is supplied on line 203. AND-gate 204 receives the CPU request on line 201 and an overflow signal from a counter 205 across line 206 as inputs. The output of AND-gate 204 is supplied on line 207 to the increment input of the counter 205. When the counter overflows, the overflow signal supplied on line 208 indicates that its threshold number of requests has been generated by CPU0. That overflow signal is fed back on line 206 to AND-gate 204 to stop incrementing of the counter when the threshold is reached. A status valid signal on line 203 is supplied to the reset input of the counter 205 in order to reset the counter whenever CPU0 encounters a successful access of data as indicated by the status valid signal. In this manner, when CPU0 suffers a threshold number of consecutive rejections without a successful access of data, the overflow signal on line 208 is generated for CPU0.

CPU1 supplies its requests on line 209 and its status valid signal on line 210 to a similar consecutive rejection counter 211. The output of the consecutive rejection counter 211 is supplied on line 212. CPU2 supplies its request on line 213 and its status valid signal on line 214 to the consecutive rejection counter 215. The output of the consecutive rejection counter 215 is supplied on line 216. CPU3 generates its requests on line 217 and its status valid signal on line 218 for supply to a consecutive rejection counter 219. The output of the consecutive rejection counter 219 is supplied on line 220.

The overflow signals on lines 208, 212, 216 and 220 are supplied to priority logic 221. This selects according to a fixed priority, the overflow signal from one of the CPUs. In the preferred embodiment, the overflow signal from CPU0 has the highest priority, from CPU1 the second-highest, from CPU2 the third-highest, and from CPU3 the lowest priority. The overflow signal having the highest priority is supplied on line 222 as a deadlock signal to an inhibit request state machine 223. The output of the inhibit request state machine 223 is supplied on line 224 to a driver 225. The output of the driver is four inhibit signals INH0-INH3, to inhibit all CPUs except the one indicated by the deadlock signal supplied to the inhibit request state machine 223 until the processing unit indicated by the input to the inhibit request state machine generates a status valid signal indicating a successful request. In the preferred embodiment, the inhibit request state machine 223 is a counter that counts a number of cycles sufficient to allow any request in the system controller to complete, and the request from the CPU that is not inhibited by the inhibit signals INH-0-INH3 to be accepted by the system controller.

For a four-CPU system in the Amdahl 5890-based multiprocessing system, the counter 205 in the consecutive rejection counters is a 7-bit counter. Likewise, the inhibit request state machine includes a 7-bit counter providing a window in which the inhibit signals are generated.

FIG. 6 illustrates the logic for accepting or rejecting requests from the plurality of central processing units and generation of the predicted busy and actual busy signals according to the present invention.

As can be seen, CPU requests are signalled on lines 300, 301, 302 and 303 for CPUs 0-3, respectively. Likewise, the inhibit signals INH0-INH3 are supplied on lines 304-307, respectively. CPU0 request on line 300 and CPU0 inhibit INH0 on line 304 are supplied as inputs to AND-gate 308. When the CPU0 inhibit signal INH0 is not asserted, the CPU0 request is supplied across line 309. Likewise, CPU1 requests on line 301, and CPU1 inhibit signal INH1 on line 305 are supplied as inputs to AND-gate 310 and the request is passed on line 311 when the INH1 signal is not asserted. CPU2 requests on line 302 and CPU2 inhibit signal INH2 on line 306 are supplied as inputs to AND-gate 312 and the request is passed on line 313 when the INH2 is not asserted. CPU3 requests on line 303 and CPU3 inhibit signal INH3 on line 307 are supplied as inputs to AND-gate 314 and the request is passed on line 315 when INH3 is not asserted.

Priority logic 316 selects from among competing requests that are not inhibited according to a preselected priority. The accepted request is supplied on line 317 to an ID selector 318. The inputs to the ID selector include the basic operating module ID from each of the CPU0–CPU3 requests on lines 319. The accepted basic operating module ID from selector 318 is supplied on line 319 to a comparator 20. The comparator 320 compares the ID on line 319 with the IDs of actual busy basic operating modules as indicated across line 321. If the BOM of the request indicated on line 319 is not busy, the signal is supplied on line 322 to enable gate 323. When the requested basic operating module is not busy, the request on line 317 is enabled and supplied to the system controller ports 324.

The signal on line 322 from comparator 320 is also supplied to a predicted busy register 329 and an actual busy register 330. The predicted busy register 329 indicates the basic operating modules that will be subject of a predicted busy signal for supply on line 331 to all the storage units in the multiprocessing system.

The actual busy register 330 indicates basic operating modules that are in the process of being accessed across line 321 for use internal to the system controller.

From the system controller ports, an access to main storage array is staged across lines 325. Further, the request is supplied to a move-in server 326 for move-in requests. The move-in server coordinates the actual move-in process, usually bringing data from the main storage array for supply to the switch and from the switch to the requesting CPU. In addition, the move-in server generates a predicted busy reset signal on line 327 and an actual busy reset signal on line 328.

FIG. 7 illustrates a state diagram of the move-in server 326. Input from SC port 324 is supplied on line 400 to stage 1, 401 of the move-in server 326. Stage 1 does initial processing of the request and signals across line 402 to initiate stage 2, 403. Stage 2 completes the move-in processing of the request and indicates across line 404 when the action is complete. Finally, the BOM busy reset stage 405 is entered which generates the actual busy reset signal on line 328. Each of the stages generates done and release signals to lines 406 for supply to the pipeline control. The pipeline control maintains the flow of an SC port request from one stage to the next in the move-in server.

The data path controller 408 receives information from stage 1, 401 across line 409 and initializes the fetch operation by issuing the system address to read the data out of the main store array. Also, selection signals are sent to the switch controller to assure that the correct source of data is supplied and validation signals for data are sent to the corresponding destination unit.

In the Amdahl 5890 machine, this three-stage move-in controller is reflected in the timing for move-in flows.

For data fetch requests from the storage unit, the move-in server issues three flows: load bypass, move-in 1 (MI1) and move-in 2 (MI2). The load bypass flow informs the storage unit that a move-in is being processed, and that the storage unit can bypass data around the buffer if it receives data bypass valid from the system controller in the following cycle. The MI1 and MI2 flows write the first and second half, respectively, of the line of data into the buffer. For a typical successful move-in, the timing of these flows is as follows:

| Load bypass | P-2 | P-1 | P | A | B | R | | | |
|---|---|---|---|---|---|---|---|---|---|
| Bypass data valid | — | | | | | | | | |
| MI-1 | | | P-2 | P-1 | P | A | B | R | |
| MI-2 | | | | P-2 | P-1 | P | A | B | R |

To enhance performance of the move-in server, it is pipelined into a two-stage machine. Stage one gathers necessary information for the request and issues the load bypass flow. Stage two finishes the request by issuing the MI1 and MI2 flows. BOM busy reset stage is also included but is used to reset the internal actual busy signal used by the system controller.

More information concerning the move-in flows is provided in the above-referenced U.S. patent application entitled CACHE MOVE-IN BYPASS.

The circuitry illustrated in FIGS. 5 and 6 is simplified over that in the two-sided embodiment as shown in FIGS. 1 and 2. In FIGS. 1 and 2, each side selects the higher priority request among its two local CPUs. This highest priority request is then piped for two cycles in order to be compared against the highest priority request made to the remote system controller. The winner of the two is then loaded into the SC ports, on both sides from which parallel access to both sides of the main store is staged. Both halves of the main store return data and a main store status valid signal in the same cycle. The half of the main store having the actual data then notifies the requesting CPU.

The system controller sets the busy signals when putting any request that is dependent on a basic operating module of the main store, into the SC ports. The busy signals for the storage units and for the system controller remain set until the request is completed. Before granting a new request priority and loading the system controller port, the system controller makes sure that the request is not dependent on a busy basic operating module.

When a request is accepted by the two system controllers in a multiprocessing system, both system controllers assert the actual busy signals at the same time. Likewise, the actual busy reset signals are cross-coupled to insure that the actual busy signals are reset simultaneously as well. This assures that when a request is rejected by one system controller, the request will also be rejected by the other system controller. The predicted busy signals sent to the storage units are timed in relation to each other so that the storage units typically make their requests arrive at the system controller in the first cycle in which the basic operating module subject of the busy signal may become available.

Data for a move-in can be supplied from any of three sources: the main store itself, the move-out queue, or a data integrity move-out from another storage unit in the multiprocessing system. Therefore, the amount of time that a given move-in process takes, varies depending upon the source of the data. Other factors as well, may cause a change in the number of cycles it takes to complete a move-in.

Most of the time, the data for a move-in is supplied from the main store array and the move-in proceeds as follows:

| states | ←Stage-1→ | | | ←Stage-2→ | | | | | | |
|---|---|---|---|---|---|---|---|---|---|---|
| | idle | LB | AB | G1 | MI1 | G2 | M2 | | | |
| MS status valid | — | | | | | | | | | |
| Load bypass | | P-2 | | | | | | | | |
| MI-1 | | | | | P-1 | | | | | |
| MI-2 | | | | | | | P-2 | P-1 | P | |
| Start BOM BUSY | | | | — | | | | | | |
| RESET stage | | | | | | | | | | |
| BOM BUSY RESET | | | | | | | — | | | |
| Predicted BUSY reset | — | | | | | | | | | |
| Fetch Port Request | | | P-3 | P-2 | P-1 | P | A | B | R | |

This diagram shows the timing of the move-in from the system controller point of view. Stage 1 is initiated when the main store (MS) status valid signal is asserted. The load bypass flow is asserted in the second cycle of stage 1 and requires two cycles for the load bypass flow to reach the subject storage unit. Therefore, it is labeled P-2 in the diagram.

In the AB cycle, abort conditions are monitored and status information is transferred to stage 2.

Then the move-in server transitions to stage 2 and in the first cycle, the BOM Busy reset stage is initiated in a typical main store move-in. The MI1 flow is staged from the second cycle of stage 2 and it will be supplied to the subject storage unit one cycle later. Two cycles later, the MI2 flow is initiated and staged in two cycles to the subject storage unit. In the P-1 cycle of MI2, the actual busy reset signal is asserted by the move-in server resetting the actual busy term on the system controller.

The BOM busy reset stage consists of a counter which is set at an initial value based upon the opcode and the start BOM busy stage signal generated by stage 2. By selecting a proper count, the actual busy term is tailored to a particular operation being staged through the pipeline at the time.

The actual busy signal is lowered in the P cycle of the MI2 flow. For a main store move-in operating smoothly, the storage unit predicted busy signal should be lowered six stages before actual busy is reset, in the P-2 stage of the load bypass flow. This is because it takes two cycles for the predicted busy term to reach the fetch port logic, and four more cycles to reach the R stage of the fetch port request. Therefore, since the storage unit busy is a predicted term and does not need to be accurate, the move-in server issues the reset signal for the predicted busy signal in the P-2 stage of the load bypass flow. Also, the P-2 cycle of the load bypass flow is the earliest time that the move-in server has sufficient information to reset the predicted BOM busy signal for a given storage unit request.

Many cases exist in the Amdahl 5890 system in which the predicted busy signal just described will be inaccurate. For instance, for a line of data that is located in a storage unit other than the requesting storage unit, a data integrity move-out of the data must be carried out from the storage unit holding the line. Therefore, the data will be supplied through the system controller before the main store status becomes valid at the requested address. This is known as a data integrity long move-out DI LMO. When the data in the long move-out process is the most current, the move-in server intercepts the data before it is loaded to the main store and sends it directly to the requesting storage unit. Upon receiving an indication that DI LMO data is forthcoming, the move-in server issues the load bypass flow and resets the S-Unit predicted busy signal. If the main store status does not become active in the following cycle, the move-in server waits in stage 1. When main store status finally comes on, the move-in server transfers to stage 2 and then the BOM busy reset stage to reset the actual busy signal. In these cases, the time between the storage unit predicted busy reset and the actual busy reset is different from the predicted time.

Another example in which the predicted busy signal will be inaccurate occurs when the move-in data is in the move-out queue. When the data is found in the move-out queue, the move-in server requests two double words of data every cycle. Because all requests are not accepted, data may not come out from the move-out queue in consecutive cycles. Therefore, the predicted busy signal will not be accurate.

Another example in which the predicted busy signal will not be accurate occurs when the move-in server pipeline becomes interlocked. For example, a request in stage 2 may not be able to complete within the four cycles required for a request to transition through stage 1. For instance, when data for a request in stage 2 comes from the move-out queue, the process of retrieving data from the move-out queue will interlock a following request in stage 1.

In the embodiment of FIG. 1, the actual BOM busy terms are reset at the same time in both system controllers but predicted SU BOM busy terms may be reset at different times. The MS status valid signals of both sides are constrained to come on at the same time, and most of the time the load bypass flow and the predicted busy signal are issued on the local side, and one cycle after that if data comes from main store. If data is from DI LMO or, MI server must wait for other information such as KEY status valid, or system integrity search status valid, before the local MI server can issue the load bypass flow (in typical cases all these status valid signals come on long before MS status valid signals come on), the local side does not issue Load Bypass and the predicted busy reset at that time.

In these cases move-in server in the remote side resets the predicted BOM busy for the SU sooner than the local side, but both sides must wait for hand-shake signal from the other before they can reset the actual BOM busy. The handshake signal is generated two cycles before actual BOM busy is allowed to be reset.

CONCLUSION

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A data processing system including more than two processing units generating requests for system data, the system data subject of a request being identified by a system address and wherein the processing units generate valid signal upon successful access to requested data, the system comprising:

main storage means for storing the system data, including a plurality of data locations being grouped in a plurality of modules, the module in which a given data location is grouped being identified by a field within the system address of the given data location;

means, coupled to each of the processing units and to receive a predicted busy signal that indicates which modules of the main storage means are predicted to be busy by the time that a request generated in the processing units reaches the main storage means, for enabling the processing units to generate requests for system data in data locations in response to the predicted busy signal; and control means, coupled to the main storage means and the processing units, for supplying requests for system data to the plurality of modules in the main storage means, including means, coupled to the processing units and receiving as inhibit signal, and responsive to the inhibit signal and predetermined processing unit priority, for selecting a request from a processing unit having priority and that is not inhibited by the inhibit signal, means, coupled to the means for selecting and responsive to a selected request, for accepting the selected request when the module identified in the system address of the request is not busy due to other accesses to data locations within the module, else rejecting the request, counting means, connected to the processing units, for counting requests generated by the respective processing units to generate respective processing unit counts, means, connected to the counting means and to receive the valid signals from the processing units, for resetting the processing unit count for a given processing unit when a valid signal is generated by the given processing unit, means, connected to the counting means, for generating a processing unit overflow signal when a processing unit count reaches a threshold number, means, connected to receive the processing unit overflow signals, for generating the inhibit signal in response to a given processing unit overflow signal indicating processing units to be inhibited from selection by the means for selecting until the given processing unit generates a valid signal, and means, coupled to each of the processing units and the means for accepting, and responsive to accepted requests, for generating the predicted busy signal.

2. The apparatus of claim 1, wherein the means, connected to receive the processing unit overflow signals, for generating the inhibit signal further includes:

means, connected to receive the processing unit overflow signals, for supplying a deadlock signal that indicates one processing unit for which a processing unit overflow signal is received; and state logic means, connected to receive the deadlock signal and to the means for selecting, for generating the inhibit signal for a preselected time interval.

3. The apparatus of claim 2, wherein the preselected time interval is at least as long as is necessary to complete all requests in the control means before the inhibit signal is generated.

4. The apparatus of claim 2, wherein the means for supplying the deadlock signal includes priority logic for selecting one processing unit overflow signal in the event that more than one processing unit overflow signal is generated at the same time.

* * * * *